United States Patent [19]

Seki et al.

[11] Patent Number: 5,207,248

[45] Date of Patent: May 4, 1993

[54] PIPE COATED WITH A RESIN LAYER ON THE INNER SURFACE THEREOF

[75] Inventors: Kuniaki Seki; Shinichi Nishiyama; Hajime Abe; Noboru Hagiwara, all of Ibaraki, Japan

[73] Assignee: Hitachi Cable, Ltd., Tokyo, Japan

[21] Appl. No.: 821,919

[22] Filed: Jan. 15, 1992

Related U.S. Application Data

[63] Continuation of Ser. No. 572,515, Aug. 24, 1990, abandoned, which is a continuation of Ser. No. 453,208, Dec. 26, 1989, abandoned, which is a continuation of Ser. No. 218,221, Jul. 13, 1988, abandoned.

[30] Foreign Application Priority Data

Jul. 14, 1987 [JP] Japan ................................. 62-175750

[51] Int. Cl.$^5$ ............................................. F16L 9/16
[52] U.S. Cl. ........................................ 138/145; 138/143; 138/DIG. 3; 138/DIG. 6; 138/DIG. 7
[58] Field of Search ............... 138/118, 124, 125, 126, 138/127, 137, 145, 146, DIG. 3, DIG. 6, DIG. 7, 140, 141, 143

[56] References Cited

U.S. PATENT DOCUMENTS

| 2,538,808 | 1/1951 | Swiss | 138/DIG. 3 |
| 2,539,329 | 1/1951 | Sanders | 138/DIG. 3 |
| 2,686,738 | 8/1954 | Teeters | 138/DIG. 3 |
| 2,705,691 | 4/1955 | Panagrossi et al. | 138/DIG. 3 |
| 2,724,672 | 11/1955 | Rubin | 138/DIG. 3 |
| 2,736,680 | 2/1956 | Kidwell | 138/DIG. 3 |
| 2,773,781 | 12/1956 | Rodman | 138/DIG. 3 |
| 3,913,625 | 10/1975 | Gazda et al. | 138/127 |
| 4,038,231 | 7/1977 | Downer et al. | 138/DIG. 7 |
| 4,330,017 | 5/1982 | Satoh et al. | 138/137 |

Primary Examiner—James E. Bryant, III
Attorney, Agent, or Firm—Lowe, Price, LeBlanc & Becker

[57] ABSTRACT

In a pipe coated with a resin layer on the inner surface thereof and a method for manufacturing the same, resin mixture including thermal melting fluoro resin and fluorine elastomer is applied to the inner surface of a pipe member. The resin mixture is thermally treated on the inner surface of the pipe member to be of a mesh like pattern so that a resin layer of a predetermined stripping strength is obtained thereon.

5 Claims, 1 Drawing Sheet

- 1 PIPE
- 5 SHAFT MEMBER
- 2 COATING RESIN
- 3 COATING MEMBER
- 4 RESIN LAYER

MIXTURE RATIO OF TETRAFLUOROETHYLENE PROPYLENE COPOLYMER (WEIGHT %)

GROOVE DEPTH (mm)

PIPE COATED WITH A RESIN LAYER ON THE INNER SURFACE THEREOF

This application is a continuation application of application Ser. No. 07/572,515, filed Aug. 24, 1990, which is a continuation of application of application Ser. No. 07/453,208, filed Dec. 26, 1989, which is a continuation application of application Ser. No. 07/218,221, filed Jul. 13, 1988; all of which are abandoned.

FIELD OF THE INVENTION

The invention relates to a pipe coated with a resin layer on the inner surface thereof and a method for manufacturing the same, and more particularly to a pipe coated with a resin layer on the inner surface thereof which is used for a warm or cold water pipe, a gas pipe, a heat-transfer tube and a pipe similar thereto through which even a corrosive fluid can be flowed and to a method for manufacturing the same.

BACKGROUND OF THE INVENTION

In conventional water pipe, gas pipe, heat-transfer tube and so on, the inner surface thereof is coated with a resin layer to improve a corrosion resistance property and avoid a chemical reaction between a pipe or tube material and a fluid flowing therein. Even in a consideration of a chemicals-proof property, thermal stability and so on, a fluoro resin is preferable to be used for such a purpose as described above.

However, a coating property of a widely used fluoro resin such as tetrafluoroethylene resin or tetrafluoroethylene-per fluoroalkylvinylether resin is not so good as expected because it is insoluble with solvent. Further, adhesiveness of the resin is low on a metal due to an inherent nature thereof. For these reasons, the resin is not suitable for a material with which a pipe is coated on the inner surface. In other words, a coating material is required to have a predetermined viscosity such that a long pipe is coated therewith uniformly on the inner surface. In this regard, such a property is not expected in the aforementioned resin. Even worse, it is necessary to adopt an appropriate measure such that the resin is firmly adhered to the inner surface of a pipe, especially, in a case where the pipe is of a metal.

SUMMARY OF THE INVENTION

Accordingly, it is an object of the invention to provide a pipe coated with a resin layer on the inner surface thereof in which adhesiveness of a coating material is improved, while preserving inherent properties of a fluoro resin such as thermal stability, water-proof, chemical proof and so on.

It is a further object of the invention to provide a pipe coated with a resin layer on the inner surface thereof in which a pipe applicable to a wide use such as a cold or warm water pipe, a gas pipe, a heat-transfer tube through which a corrosive fluid is flowed and so on is obtained.

It is a still further object of the invention to provide a pipe coated with a resin layer on the inner surface thereof in which a pipe having a flexibility indispensable thereto is obtained so that the pipe can be bent in a pipe arrangement with a predetermined curvature.

According to a feature of the invention, a pipe coated with a resin layer on the inner surfaces thereof comprises, a pipe member, and a resin layer provided on the inner surface of said pipe member, wherein said resin layer is of a mixture including thermal melting fluoro resin and fluorine elastomer (elastomer including fluorine).

In the features of the invention, the thermal melting fluoro resin is at least one selected from an alternating copolymer of ethylene and tetrafluoroethylene, an alternating copolymer of ethylene and chlorotrifluoroethylene, tetrafluoroethylene-hexafluoropropylene copolymer and so on, and the fluorine elastomer is at least one selected from tetrafluoroethylene-propylene system copolymer, vinylidene fluoride-hexafluoropropylene system copolymer, vinylidene fluoride chlorotrifluoroethylene, vinylidene fluoridepentafluoropropene system copolymer, acrylate system elastomer including polyfluoroalkyl-group, tetrafluoroethylene-vinylidene fluoride-propylene system copolymer, tetrafluoroethylene-ethyleneisobutylene system copolymer, ethylenehexafluoropropene system copolymer, tetrafluoroethylene -butene-1 system copolymer, tetrafluoroethylene-ethyl vinyl ether system copolymer, phosphonitrile elastomer including fluorine, tetrafluoroethylene-fluoro vinyl ether system copolymer and so on. Especially, tetrafluoroethylene propylene system copolymer is most appropriate to be selected therefrom.

The mixture ratio of fluorine elastomer is appropriate to range from 10 to 90 weight percents in regard to thermal melting fluorine resin for the reason why adhesiveness and flexibility of a coating film is not improved less than 10% and mechanical strength of the coating film becomes low more than 90%. A coating material in which finely-powdered thermal melting resin is dispersed in fluorine elastomer dissolved in solvent is applied to the inner surface of a pipe, and a film thus coated thereon is dried and then heated at a temperature more than a melting point of the thermal melting fluorine resin for a predetermined time so that a resulting film in which the fluoro resin and the fluorine elastomer are linked with mesh like pattern is obtained on the inner surface of the pipe. As a matter of course, the above described heating treatment is performed below a temperature at which a pipe is subject to a deformation. A thickness of the coating film thus obtained is appropriate to range from 0.01 to 0.5 mm. In the invention, a metal pipe such as copper, copper alloy, aluminum, aluminum alloy and so on having an outer diameter less than approximately 50 mm is used to be coated with a resin layer on the inner surface. The metal pipe is preferable to have a number of grooves or projections to be extended parallel or helically in the axial direction thereby improving adhesiveness of a coating layer to the inner surface thereof. The grooves or projections may be continuous or intermittent along the axial direction, and may be intersected by crossing grooves or projections. Although the configuration and number of grooves or projections are not limited, a height or depth of the grooves or projections is preferable to range from 0.01 to 0.2 mm for the reason why an effect of improving adhesiveness of a resin layer is limited to a small extent by less than 0.01 mm, while a thickness uniformity of the resin layer is difficult to be maintained along the length thereof by more than 0.2 mm, and a resin consuming amount is further increased.

BRIEF DESCRIPTION OF DRAWINGS

The invention will be explained in more detail in conjunction with appended drawings wherein.

DESCRIPTION OF PREFERRED EMBODIMENTS

Figure 1:
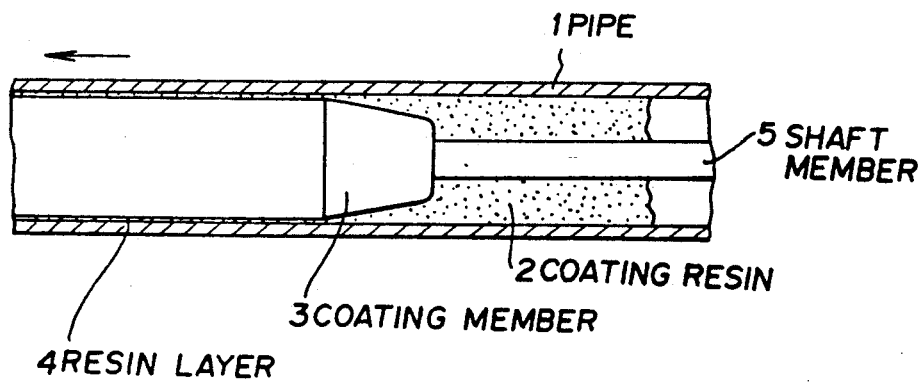
FIG. 1 is a cross-sectional view showing a method for manufacturing a pipe coated with a resin layer on the inner surface thereof.

In FIG. 1, there is shown a method for manufacturing a pipe coated with a resin layer on the inner surface thereof in an embodiment according to the invention. A coating member 3 which is supported by a shaft member 5 is inserted into a metal pipe 1, and coating resin 2 is supplied on one side of the coating member 3 to the inside of the metal pipe 1. In this circumstance, the metal pipe 1 is moved in a direction indicated by an arrow without receiving any deformation. Although the coating resin 2 tends to be left behind the coating member 3, a major portion of the coating resin 2 is squeezed in a narrow gap between the periphery of the coating member 3 and the inner surface of the metal pipe 1 thereby being formed as a resin layer 4 on the inner surface thereof. A thickness of the resin layer 4 thus formed thereon is adjusted by selecting a predetermined outer diameter of the coating member 3 dependent on a inner diameter of the metal pipe 1.

Although the coating member 3 is illustrated by a taper shaped plug in FIG. 1, it may be of another shape, for instance, of a ball shaped plug. Although the resin layer 4 is formed on the inner surface of the metal pipe 1 which is not subject to any deformation, the metal pipe 1 may be coated with the resin layer 4 on an inner surface portion at a short distance front position of which a diameter of the metal pipe 1 is shrunken by a pulling die. In a case where the metal pipe 1 is coated on the inner surface thereof with the resin layer 4 under the shrinkage of a diameter thereof, the coating member 3 may be provided at a position inside the metal pipe 1 where a pulling die is provided on the periphery of the metal pipe 1 as if a pulling plug is provided at the position, or may be provided to be connected through a connecting rod to such a pulling plug which is provided at a short distance front position thereof. In such a case, a longer metal pipe can be coated on the inner surface thereof with a resin layer than the metal pipe 1 shown in FIG. 1, if the coating member 3 and a supporting member to be connected to the coating member 3 are floated inside the metal pipe 1.

The resin layer 4 thus formed on the inner surface of the metal pipe 1 is dried and then heated at a temperature more than a melting point of a thermal melting resin included in the coating resin 2 and less than that of the metal pipe 1 thereby providing a predetermined thin resin layer in which components thereof are linked with a mesh like pattern.

The embodiment described above will be explained in more detail in following Examples 1 to 4.

[Example 1]

A copper pipe 1 having an outer diameter of 12.7 mm and a thickness of 0.7 mm in which sixty grooves each having a depth of 0.05 mm and provided in a constant interval along the inner periphery thereof is prepared, and eight compositions for coating resin 2 (paint dissolved by mixture solvent including butyl acetate and ethyl acetate in which a solid proportion is fifty weight percents) in which tetrafluoroethylene-propylene copolymer (AFLUS 100 of ASAHI GLASS Co., Ltd. Tokyo, Japan) is mixed ranging from 0 to 100 weight percents with a finely powdered base of tetrafluoroethylene-ethylene copolymer are further prepared. Eight copper pipes 1 each thus prepared are coated on the inner surfaces thereof with the eight compositions of the coating resin 2 also thus prepared, respectively, to form resin layers 4 each having a thickness of 0.15 mm in a manner as shown in FIG. 1. All of the copper pipes 1 thus coated on the inner surfaces with the resin layers 4 are dried, and then heated at temperatures, the maximum one of which is 350° C., for times ranging from 30 to 60 minutes to provide complete films having thicknesses ranging from 30 to 70μm.

Figure 2:
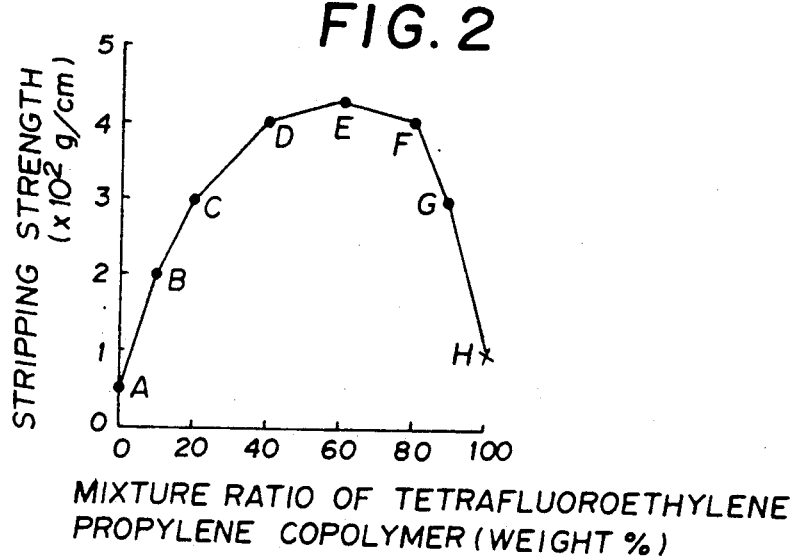
FIG. 2 is a graph showing a relation between a strength of stripping a resin layer from the inner surface of a pipe and a mixture ratio of components of a coating resin.

The films of the eight copper pipes 1 are measured in regard to stripping strengths dependent on the mixture ratios of tetrafluoroethylene-propylene copolymer as shown by eight points "A","B","C", . . . ,"H" in FIG. 2. The stripping strength of each copper pipe 1 is defined by a force which is required to strip the film from the inner surface of the copper pipe 1 in a width of 10 mm and in a direction of 90 degrees. The stripping strength may be referred to as "adhering strength". In the result of the measurement, a definite stripping strength can not be measured in a case where a mixture ratio of tetrafluoroethylenepropylene copolymer is 100% as shown by the point "H" in FIG. 2, because a mechanical strength of the resin is low.

[Example 2]

Seventy copper pipes 1 each having an outer diameter of 12.7 mm and a thickness of 0.7mm, and each of which is provided on the inner surface thereof with seventy grooves each having a width of 0.2 mm, an interval of 0.5 mm along the inner periphery thereof, and depths ranging from 0.005 to 0.2 mm are prepared, and coating resin 2 (paint dissolved by mixture solvent including butyl acetate and ethyl acetate in which a solid proportion is fifty weight percents) in which tetrafluoroethylene-ethylene copolymer (AFLUS 100 of ASAHI GLASS Co., Ltd. Tokyo, Japan) is mixed ranging from 0 to 100 weight percents with a finely powdered base of tetrafluoroethylene-ethylene copolymer (AFLON COP C-88A of ASAHI GLASS Co., Ltd. Tokyo, Japan) is further prepared. A resin layer 4 is formed to be a thickness of approximately 0.1 mm on the inner surface of each copper pipe 1 and then dried in the same manner as in the Example 1. Thereafter, each copper pipe 1 is heated in the same manner as in the Example 1 thereby providing a complete film having an average thickness of 30μm on the ridge between the grooves.

Figure 3:
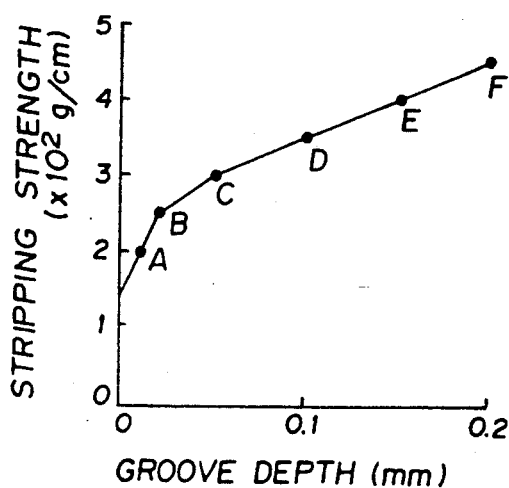
FIG. 3 is a graph showing a relation between a strength of stripping a resin layer from the inner surface of a pipe and a depth of grooves.

The stripping strength of the film is measured in each copper pipe 1 and is shown by six points "A","B","C", . . . "F" in FIG. 3. As apparent from the result, the stripping strength is increased dependent on an increased depth of the grooves.

[Example 3]

An aluminum pipe 1 having an outer diameter of 20 mm and a thickness of 2 mm in which grooves each having a depth of 0.1 mm, a width of 0.4 mm, and an interval of 0.7 mm along the inner periphery thereof are provided on the inner surface is prepared, and coating resin 2 (paint dissolved by solvent including ethyl acetate in which a solid proportion is fifty percents) in which tetrafluoroethylene-propylene copolymer (AFLUS 100 of ASAHI GLASS Co., Ltd. Tokyo, Japan) of fifty weight percents and tetrafluoroethylenehexafluoropropene coplymer (NEOFLON FEP powdered paint NC-1500 of DAIKIN INDUSTRIES, Ltd. Tokyo, Japan) of fifty weight percents are mixed with each other is further prepared. A film having an average thickness of 40μm on the ridge between the grooves is provided on the inner surface of the aluminum pipe 1 through the process of the coating, drying and heating treatments as described in the Examples 1 and 2.

The stripping strength of the film thus obtained is measured in the same manner as in the Examples 1 and 2, and it is confirmed from the result of 520 g/cm that adhesiveness is as good as expected.

[Example 4]

A copper pipe 1 having an outer diameter of 22.2 mm and a thickness of 1.14 mm in which grooves each having a depth of 0.1 mm, a width of 0.3 mm, and an interval of 0.6 mm are provided on the inner surface thereof is prepared, and coating resin 2 (paint dissolved by solvent of butyl acetate in which a solid proportion is fifth weight percents) in which finely powdered trifluoroethylene (DIFLON of DAIKIN INDUSTRIES, Ltd. Tokyo, Japan) and vinylidene difluoride-proplylene fluoride coplymer elastomer (DIEL G801 of DAIKIN INDUSTRIES, Ltd. Tokyo, Japan) are mixed with each other is further prepared. A thin resin layer 4 of approximately, 0.1 mm is formed on the inner surface of the copper pipe 1 in the same manner as in the Examples 1 to 3, and then dried in an atmosphere of 100° C. in a furnace. The copper pipe 1 is then heated at a temperature of 260° C. for thirty minutes to provide a film having an average thickness of 30μm on the ridge of the grooves on the inner surface thereof. As a result, the stripping strength of 300 g/cm is obtained in accordance with the measurement conducted in the same manner as in the Examples 1 to 3.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. A pipe coated with a resin layer on the inner surface thereof comprising,
    a pipe member, and
    a resin layer provided on the inner surface of said pipe member,
    wherein said resin layer is a mixture which includes a thermal melting fluoro resin and tetrafluoroethylene-propylene copolymer formed into a linked structure by combining said tetrafluoroethylene-propylene copolymer, dissolved in a solvent, with said thermal melting fluoro resin, in a powdered form, and heating said mixture to melt said thermal melting fluoro resin and thus form said linked structure.

2. A pipe coated with a resin layer on the inner surface thereof according to claim 1,
    wherein a mixture ratio of said tetrafluoroethylene-propylene copolymer ranges from 10 to 90 weight percent.

3. A pipe coated with a resin layer on the inner surface thereof according to claim 1,
    wherein a thickness of said resin layer ranges from 0.01 to 0.2 mm.

4. A pipe coated with a resin layer on the inner surface thereof according to claim 1,
    wherein said pipe member is provided with grooves or projections each having a depth or height ranging from 0.01 to 0.2 mm.

5. A pipe coated with a resin layer on the inner surface thereof according to claim 1,
    wherein said pipe member is of a metal.

* * * * *